Oct. 9, 1956     C. C. SINCLAIR     2,765,571
FISHING LURE
Filed Sept. 8, 1952     2 Sheets—Sheet 1
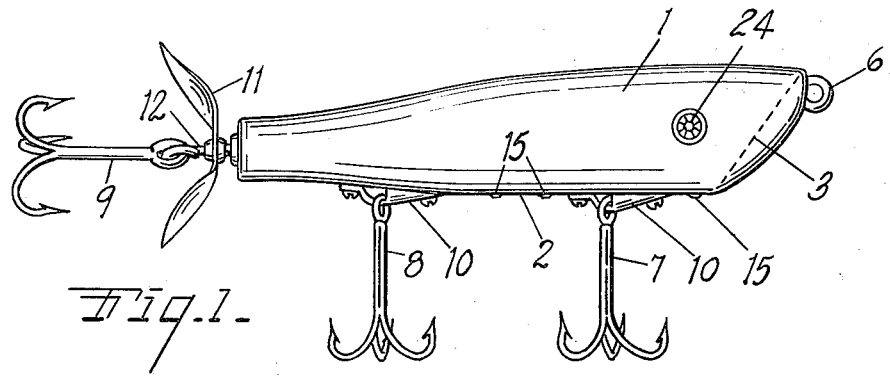
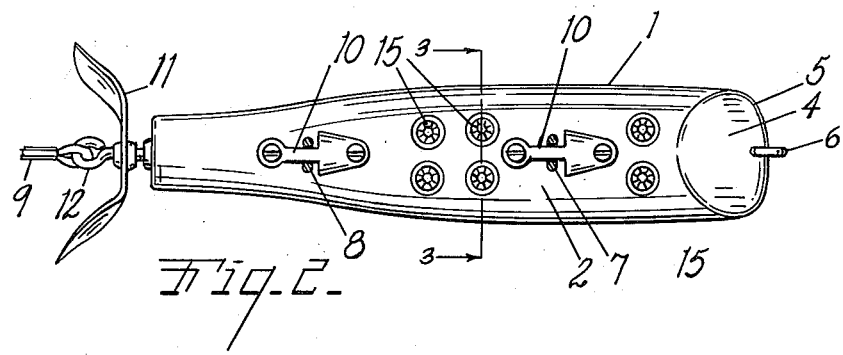
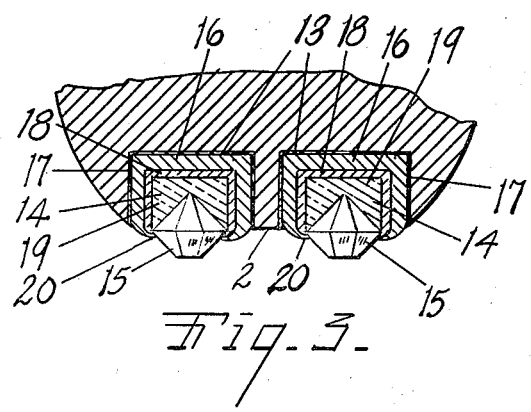
INVENTOR.
Clyde C. Sinclair
BY
ATTORNEY.

Oct. 9, 1956        C. C. SINCLAIR        2,765,571

FISHING LURE

Filed Sept. 8, 1952                                                  2 Sheets-Sheet 2

INVENTOR.
Clyde C. Sinclair
BY
Otis A. Earl
ATTORNEY

United States Patent Office 2,765,571
Patented Oct. 9, 1956

2,765,571

FISHING LURE

Clyde C. Sinclair, Paw Paw, Mich., assignor to Paw Paw Bait Company, Paw Paw, Mich.

Application September 8, 1952, Serial No. 308,403

4 Claims. (Cl. 43—42.34)

This invention relates to improvements in fishing lure of the so-called "plug type."

The main objects of this invention are:

First, to provide a fishing lure which has a pronounced zig-zag action when drawn through or along the surface of the water, and which is provided with means for reflecting light, thereby increasing its attractiveness.

Second, to provide a fishing lure having these qualities in which the light reflecting means are positioned so that the reflections are greatly varied by the movement of the bait through the water.

Objects relating to details and economies of the invention will appear from the description to follow. The invention is defined and pointed out in the claims.

A preferred embodiment of the invention is illustrated in the accompanying drawing, in which:

Fig. 1 is a side elevational view of a bait or lure embodying my invention, the hooks being shown in extended position.

Fig. 2 is a bottom view with the hooks partially broken away.

Fig. 3 is an enlarged transverse section on a line corresponding to line 3—3 of Fig. 2.

Figure 4:
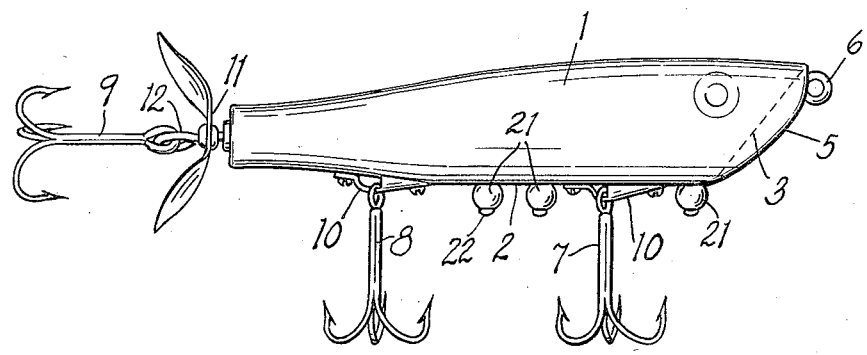
Fig. 4 is a side elevational view of a modified form or embodiment of my invention, the hooks being shown in extended position.

The embodiments of my invention illustrated comprise a body 1 formed of wood or plastic and of generally circular section. The bottom of the bait has a flattened longitudinally extended portion 2 of substantial length extending from its front end and merging into the tapered rear portion of reduced diameter. The front end of the body is downwardly and rearwardly inclined as indicated generally by the dotted line 3 in Fig. 1, and has a concave recess 4 of substantially the full dimension of the end of the body, the recess being of such size as to provide a relatively narrow rim-like portion 5 surrounding the recess except at the bottom where the recess merges into the flattened portion or surface 2. The line attaching eye 6 is disposed centrally at the top of the recess. When the lure is propelled through the water by a line attached to the eye 6 the bait has a substantial zig-zag or swimming movement at or adjacent to the surface of the water, and the recess also acts to spray or throw water laterally if the lure is propelled through the water at a substantial speed. The body 1 of the lure being of wood facilitates floating of the lure. The lure illustrated is provided with triple hooks 7, 8 and 9, these hooks being the same except as to their position. The hook 7 is mounted by means of the attaching member 10 on the flattened portion 2 of the body, and at a point intermediate its ends. The hook 8 is mounted on the underside of the body at the rear of the flattened body portion, while the hook 9 is a trailing hook. A spinner 11 is mounted on the hook attaching screw 12.

In the embodiment shown in my invention illustrated in Figs. 1 to 3 inclusive, the flattened underside of the body is provided with a plurality of recesses 13 preferably arranged in transversely alined pairs to receive light reflecting elements designated generally by the numerals 14. These light reflecting elements comprise the brilliants 15, and I use the term brilliants to designate brilliant or diamond cut pieces of glass which are generally designated as brilliants in industry, set in holders 16 fittingly received and adhesively secured in the recesses. The adhesive being indicated at 17.

The mountings or holders include reflectors 18 and the transparent brilliant setting material 19. The edges 20 of the holders are spun over the brilliants with the brilliants projecting from the holders. The holders are mounted in the recess with their edges slightly projecting so that the cut faces of the brilliants project from the surface of the body on which the reflecting elements are mounted. The reflecting elements are disposed adjacent to the forward hook mounting with reflectors in front of and at the rear thereof. The reflecting elements are preferably arranged closely adjacent the edges of the flattened bottom surface which increases the visibility thereof when the bait is viewed sidewise or at an upward angle. Reflecting elements of the same type and designated generally by the numeral 24 are provided to represent eyes.

Figure 5:
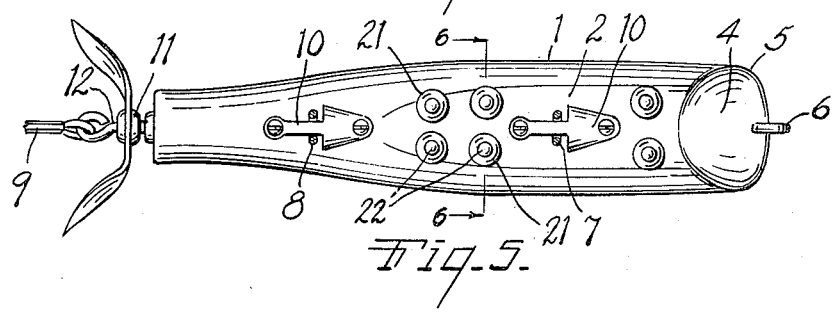
Fig. 5 is a bottom view of the embodiment shown in Fig. 4 with the hooks partially broken away.
Figure 6:
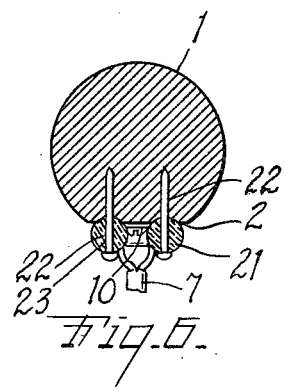
Fig. 6 is an enlarged transverse section taken on a line corresponding to line 6—6 of Fig. 5.

In the embodiment illustrated in Figures 4, 5 and 6 the reflector elements 21 are in the form of beads secured to the bait body by means of the brads 22 disposed through the holes 23 of the bead like elements. These reflecting elements 21 project further from the bait body than the reflecting elements of the preferred embodiment and while they have that advantage they have somewhat less reflecting capacity than the brilliant type of elements of the preferred embodiment.

In both embodiments of my invention the reflecting elements proper are desirably of glass which may be variously colored although other reflecting material which is effective in reflecting light, such for example, as some plastics may be employed. By positioning the reflecting elements adjacent the mergence of the flattened portion of the curved side walls, as illustrated in the drawings, the angular range of visibility of the elements is substantially increased. Where hooks are mounted on the sides of the bait the reflecting elements are grouped about them.

I have not attempted to illustrate other modifications and adaptations which I contemplate, as it is believed that this disclosure will enable those skilled in the art to embody or adapt my invention as may be desired.

Having thus described my invention, what I claim as new and desire to secure by Letters Patent is:

1. A fishing lure comprising a buoyant and elongated rearwardly tapered body of a generally circular sectional configuration and having a flattened bottom surface portion extending rearwardly from its front end to a point spaced from its rear end, said body being balanced to float flat in the water, the forward end face of said body being inclined downwardly and rearwardly to said bottom surface portion along a cylindrical surface whereby the sides of the front end form forwardly projecting lips, a line attaching member connected to said front end at the forwardly projecting tip thereof and in the transverse center thereof, hooks mounted on said bottom portion and at the tail of said body, said body having a plurality of recesses formed therein at the side edges of said bottom portion and at the front and rear of one of the hooks on said bottom portion, recessed brilliant holders mounted in said recesses and having light reflective inner surfaces, and light transmitting and reflecting brilliants mounted in said holders in light transmitting relation to the reflecting surfaces of the holders and projecting outwardly from said bottom portion and the circular section of the body whereby light directed downwardly and laterally along the side of the body is intercepted and reflected by the brilliants.

2. A fishing lure comprising a buoyant and elongated rearwardly tapered body of a generally circular section and having a flattened bottom surface portion extending rearwardly from its front end and balanced to float flat in the water, the forward end of said body being inclined downwardly and rearwardly to said bottom surface portion, a line attaching member connected to said front end at the forwardly projecting tip thereof and in the transverse center thereof, hooks mounted on said bottom portion and at the tail of said body, said body having a plurality of recesses formed therein at the side edges of said bottom portion and at the front and rear of one of the hooks on said bottom portion, recessed brilliant holders mounted in said recesses and having light reflective inner surfaces, and light transmitting and reflecting brilliants mounted in said holders in light transmitting relation to the reflecting surfaces of the holders and projecting outwardly from said bottom portion and the circular section of the body whereby light directed downwardly and laterally along the side of the body is intercepted and reflected by the brilliants.

3. A fishing lure comprising a buoyant and elongated rearwardly tapered body of a generally circular section and having a flattened bottom surface portion extending rearwardly from its front end and balanced to float flat in the water, the forward end of said body being inclined downwardly and rearwardly to said bottom surface portion, a line attaching member connected to said front end in the transverse center thereof, hooks mounted on said bottom portion and at the tail of said body, said body having a plurality of recesses formed therein at the side edges of said bottom portion and at the front and rear of one of the hooks on said bottom portion, recessed brilliant holders mounted in said recesses and having light reflective inner surfaces, and light transmitting and reflecting brilliants mounted in said holders in light transmitting relation to the reflecting surfaces of the holders and projecting outwardly from said bottom portion and the circular section of the body whereby light directed downwardly and laterally along the side of the body is intercepted and reflected by the brilliants.

4. A fishing lure comprising a buoyant and elongated rearwardly tapered body of a generally circular section and having a flattened bottom surface portion extending rearwardly from its front end and balanced to float flat in the water, the forward end of said body being inclined downwardly and rearwardly to said bottom surface portion, a line attaching member connected to said front end in the transverse center thereof, hooks mounted on said bottom portion and at the tail of said body, said body having a plurality of recesses formed therein at the side edges of said bottom portion and at the front and rear of one of the hooks on said bottom portion, recessed brilliant holders mounted in said recesses and having light reflective inner surfaces, and light transmitting and reflecting brilliants mounted in said holders in light transmitting relation to the reflecting surfaces of the holders and projecting outwardly from said bottom portion whereby light directed downwardly and laterally along the side of the body is intercepted and reflected by the brilliants.

References Cited in the file of this patent

UNITED STATES PATENTS

| Re. 13,828 | Lambert | Nov. 17, 1914 |
| D. 116,678 | Dalton | Sept. 19, 1939 |
| D. 117,378 | Larson | Oct. 31, 1939 |
| 1,226,701 | Schillinger | May 22, 1917 |
| 1,294,938 | Mullen | Feb. 18, 1919 |
| 1,489,043 | Reinewald | Apr. 1, 1924 |
| 1,513,237 | Green | Oct. 28, 1924 |
| 1,546,673 | Poulsen | July 21, 1925 |
| 2,036,946 | Malecek | Apr. 7, 1936 |
| 2,251,593 | Mangle | Aug. 5, 1941 |
| 2,262,974 | Steiner | Nov. 18, 1941 |
| 2,547,240 | Young et al. | Apr. 3, 1951 |